United States Patent
Bergstrom

[11] Patent Number: 5,915,770
[45] Date of Patent: Jun. 29, 1999

[54] ELECTRICIANS CABLING POLE

[76] Inventor: John A. Bergstrom, 750 C.J. Moe Blvd., Dassel, Minn. 55325

[21] Appl. No.: 08/908,277

[22] Filed: Aug. 7, 1997

[51] Int. Cl.⁶ .......................................................... B25J 1/04
[52] U.S. Cl. ..................................... 294/19.1; 254/134.3 R
[58] Field of Search ............................... 294/19.1, 24, 26; 254/134.3 R, 134.3 FT, 134.7; 81/53.1; 403/292, 296, 345

[56] References Cited

U.S. PATENT DOCUMENTS

| | | | |
|---|---|---|---|
| 1,205,852 | 11/1916 | Buehler | 294/26 |
| 1,370,651 | 3/1921 | Johnson, Jr. | 81/53.1 |
| 1,865,526 | 7/1932 | Lawlor | 294/19.1 |
| 2,488,396 | 11/1949 | Gottholm | 294/19.1 |
| 2,739,832 | 3/1956 | Thorpe | 294/19.1 |
| 3,004,362 | 10/1961 | Day | 294/19.1 |
| 3,182,960 | 5/1965 | French | 254/134.7 |
| 3,433,521 | 3/1969 | Lasko | 294/19.1 |
| 4,514,004 | 4/1985 | Morgan | 294/19.1 |
| 4,854,546 | 8/1989 | Vea | 254/134.3 R |
| 5,052,660 | 10/1991 | Bergman | 254/134.3 FT |
| 5,458,317 | 10/1995 | Caracofe et al. | 254/134.3 R |

Primary Examiner—Dean Kramer

[57] ABSTRACT

The disclosed tool is an elongated sectional pole that allows the user to install, remove or reposition, cable in ceilings, walls, floors and other limited access areas of structures. The disclosed tool consists of one or two end sections and any number of middle sections to get the desired length. The end sections are similar; the tips of the end sections are identical, consisting of a conical shaped tip with a hole for insertion of cable or other useful attachments; the opposite end of the tip section consists of a male or a female connector. The middle sections are poles of the same diameter as the end sections, with one end of the middle section having a male connector and the other end a female connector. The disclosed tool permits cable to be installed by affixing cable directly, or with attachments, to either end of the pole and pulling, pushing or lifting it into limited access areas. In other instances, with the use of attachments, the tool may be used to capture cable in limited access areas, and thereby reposition or remove it.

3 Claims, 2 Drawing Sheets

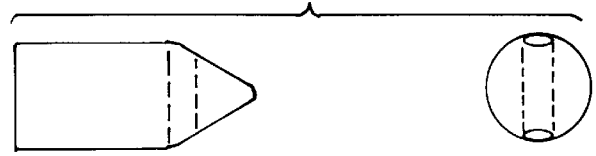
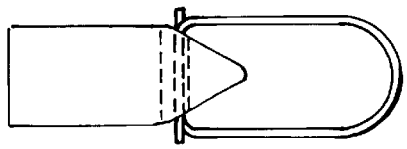 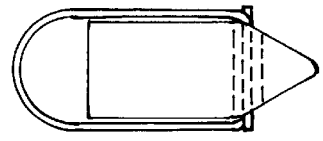
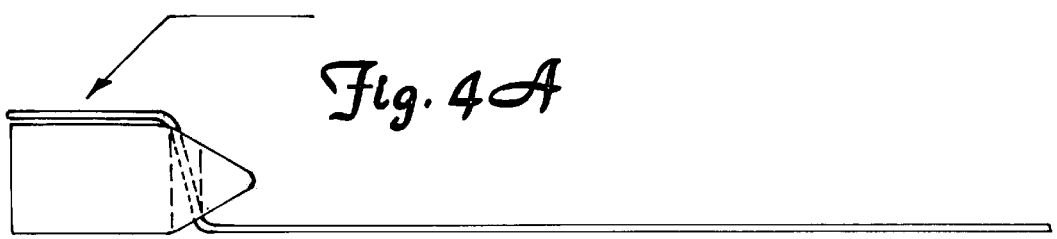

ELECTRICIANS CABLING POLE

BACKGROUND OF THE INVENTION

1. Field of Invention

The present invention relates generally to a electricians cabling pole and more specifically to a elongated sectional pole for installing cable in limited access areas of structures.

2. Description of Prior Art

In commercial and industrial electrical construction low voltage communication type cable is usually not put in conduit, and in residential construction there is very little conduit used for either high or low voltage electrical work. Cable, consisting of one or more insulated conductors of varying sizes surrounded by a secondary covering of insolation, is necessary to interface computers, printers, telephones, facsimile machines and alarm systems, as well as for power transmission. The ability to install cable efficiently is an important cost factor in all types of construction.

Today the placing of cable in ceilings, walls, floors and other limited access areas of structures is an important part of both new and remodeling construction. It is also necessary today to capture cable previously placed in limited access areas to move or remove it.

The existing cabling tools lack versatility, thus requiring a number of different tools on the job site for efficient placing and capturing of cable. Some cabling tools are good in walls, others in ceilings, some lift cable into place, while others pull or pull it and still others are used to capture cable, but none have the versatility to work well in more then a few applications. For example U.S. Pat. No. 5,458,317 to Caracof (1995) is useful for pushing cable only, and the plane of the head portion is larger then the diameter of the tool making it difficult to use if insulation is in the way. The implement described in U.S. Pat. No. 4,854,546 to Vea (1989) is limited to the use of one end and for pulling cable with an oversized head portion. The fishing pole in U.S. Pat. No. 3,182,960 to French (1962) is limited to capturing and pulling cable and suffers from a large head.

The installer must know which tool is the best, where it is, and how to use it. In most cases the installer would be fortunate to have more than one cabling tool available and would end up with inefficiency at best.

OBJECTS AND ADVANTAGES

It is the purpose of the present invention to have the widest possible versatility in the placement, removal, and repositioning of cable in ceilings, walls, floors, and other limited access areas of structures. This will enable the installer to use the same tool for all cabling tasks.

It is an object of the present invention to slide cable over ceilings by pushing the pole and pulling the attached cable horizontally through the ceiling cavity. This is accomplished by affixing one or more cables directly to the end section of the pole or to the loop attachment attached to the end section of the pole already assembled in the ceiling. Then the pole is pushed forward, while simultaneously using a shaking motion, which allows the pole to pass obstacles it encounters as it moves forward through the ceiling, pulling the affixed cable. The combination of stiffness and light weight of the pole allows the installer to manipulate the fully assembled pole with ease through all types of ceilings, even when insulation is present. The pole also works well in cable trays, through bar joists, or through trusses. If cable is affixed to the front of the pole, it can be pushed or lifted into place. The pole also works well in ceilings for capturing cable to be moved or removed. To do this a cable capturing attachment is fastened to either end of the pole to capture the cable, then the cable can be pushed or pulled into a new position.

It is an object of the present invention to slide cable up or down walls by pushing the pole and pulling the attached cable vertically though the wall cavity. This is done by affixing the cable to the tip of the pole directly, or by using the loop attachment attached to the tip to affix the cable. Then the assembled pole is pushed up or down through the wall pulling the cable. For normal height walls only the end sections are needed, but if the wall is higher or you are going up more then a single story, one or more middle sections can be used. The conical shape of the tips of the end sections and the stiffness of the sections permits the piercing of insulation so cable can be slid into insulated walls. The flexibility of the pole allows the cabling of walls because of the tight places encountered in walls. Cable can also be affixed to the front section and can be pushed up or down a wall. It is possible to capture cable in walls by installing the cable capture attachment to the tip of the pole.

It is an object of the present invention to slide cable under floors by pushing the pole and pulling the cable horizontally through the floor cavity. This is accomplished in the same manner as in ceilings described above.

It is the object of the present invention to slide cable into limited access areas in structures. I will merely name some of these areas, because the manner in which the cable is run will be much the same as previously described for ceilings, walls and floors. These spaces include heating or cooling duct work, movable office partition, behind decorative trim, and behind indirect lighting panels.

DRAWING FIGURES

In the drawings, closely related figures have the same number but different alphabetic suffixes.

FIG. 2 is a side and the front view of a tip of an end section.

FIG. 3A is the side view of the loop attachment attached to the tip of the end section.

FIG. 3B is the side view of the loop attachment attached of the tip of the end section and swung back against the end section.

FIG. 4A is a cable capture attachment attached to the tip of the end section.

FIG. 4B is a cable capture attachment bent into a "V" shape.

FIG. 4C is a cable capture attachment bent into a "Z" shape.

FIG. 4D is a cable capture attachment bent into a hook shape.

DESCRIPTION - - - FIGS. 1 to 4

Figure 1:
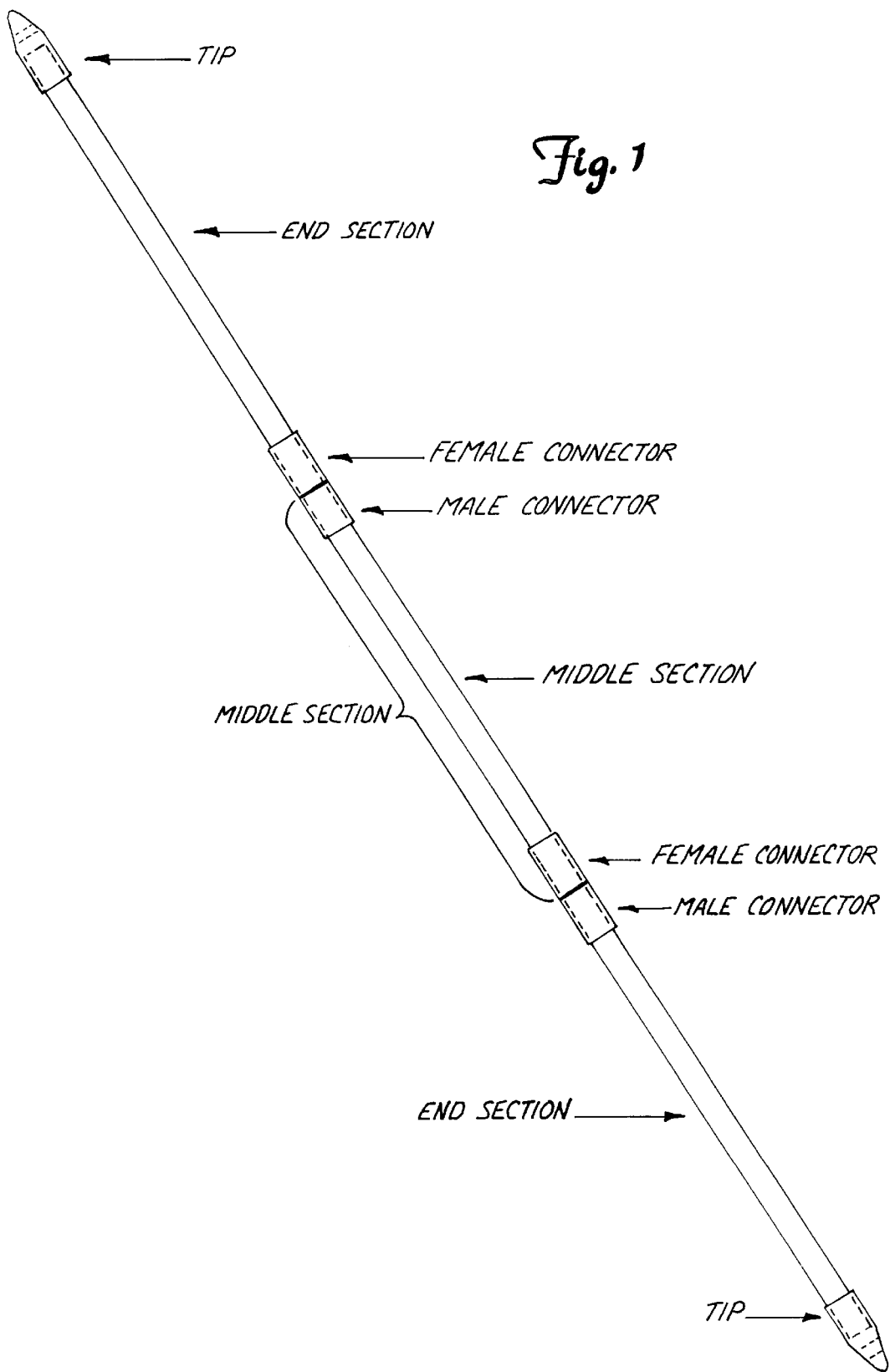
FIG. 1 is a side view of two end sections and one middle section of an assembled electricians cabling pole.

A typical configuration of the present invention is illustrated in FIG. 1. The user can install, remove and reposition cable in ceilings, walls, floors and other limited access areas. To accommodate different lengths needed when using the invention, one end section may be used alone, two end sections may be connected and used, or two end sections and any number of middle sections may be connected and used. One end section has a female connector and the other end section has a male connector. Each middle section has one female end and one male end, thus providing maximum versatility as to length. When assembled with two end sections, both tips are identical and so are interchangeable in their use, thus either end of the pole can be used for attaching cable directly or for attaching attachments.

By the utilization of materials combining flexibility, stiffness, light weight and strength, such as fiberglass tubing and aluminum tips and connectors, the electricians cabling pole has the ability to slide cable over the long distances found typically in ceilings and floors, and yet with sufficient flexibility and strength to slide cable through tight places found typically in walls and other limited access areas. Furthermore, by utilizing a light colored fiberglass tubing, the pole can be seen well in low light situations often encountered in this type of work. The fiberglass tubing is non-conductive which is an important safety factor for this type of tool.

The tip of the end section of FIG. 2 has a conical shaped end that enables it to slip past obstructions as it is pushed with a shaking motion through limited access areas. The hole in the tip FIG. 2 is used to affix cable directly to the tip or as a connection point for attachments that aid in affixing or capturing cable.

The loop attachment of FIG. 3A is a one piece steel wire attached through the hole in the tip of the end section and formed in a elongated loop. The loop is designed for quick attachment or detachment and with the strength to successfully pull the affixed cable. The loop attachment of FIG. 3A is able to swing almost 360 degrees, around the hole in the tip of the end section so it is out of the way back against the pole as shown in FIG. 3B. This allows the pole with the loop attachment attached to be easily pushed or pulled in limited access areas and cable to be affixed at any angle to the pole.

The cable capture attachment of FIG. 4A is connected to the pole of FIG. 1 by means of the hole in the tip of the end section FIG. 2 and the bend of this attachment. To secure the cable capture attachment of FIG. 4A, a few rounds of electrical tape are used at the point shown by the arrow. The free end of the cable capture attachment of FIG. 4A is shaped and sized by the user as necessary, as shown in FIG. 4B,C,D.

I claim:

1. A device for placing, moving and removing cable into and through ceilings, walls, floors, and other limited access areas, comprising:

(a) one or more fiberglass tubes of approximately one-quarter inch outside diameter with a female connector on one end and a male connector on the other end;

(b) one fiberglass tube of approximately one-quarter inch outside diameter with a female connector on one end to interface with the male connector and a conical shaped tip with a hole on the other end; and (c) one fiberglass tube of approximately one-quarter inch outside diameter With a male connector on one end to interface with the female connector and a conical shaped tip with a hole on the other end.

2. The device of claim 1 wherein each of said fiberglass tubes are approximately five feet long.

3. The device of claim 1 wherein attachments for affixing or capturing cable can be inserted into the hole in the conical shape tip.

* * * * *